US009779139B1

(12) United States Patent
Duddu et al.

(10) Patent No.: US 9,779,139 B1
(45) Date of Patent: *Oct. 3, 2017

(54) CONTEXT-BASED FILTERING OF SEARCH RESULTS

(71) Applicant: Google Inc., Mountain View, CA (US)

(72) Inventors: Sarveshwar Duddu, Bangalore (IN); Kuntal Loya, Bangalore (IN); Minh Tue Vo Thanh, Cambridge, MA (US); Thorsten Brants, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/070,769

(22) Filed: Mar. 15, 2016

Related U.S. Application Data

(63) Continuation of application No. 14/310,594, filed on Jun. 20, 2014, now abandoned, which is a continuation of application No. 13/459,540, filed on Apr. 30, 2012, now Pat. No. 8,762,368.

(51) Int. Cl.
*G06F 17/30* (2006.01)

(52) U.S. Cl.
CPC .... *G06F 17/30528* (2013.01); *G06F 17/3053* (2013.01); *G06F 17/30598* (2013.01); *G06F 17/30867* (2013.01)

(58) Field of Classification Search
CPC ......... G06F 17/30864; G06F 17/30867; G06F 17/30705; G06F 17/30713; G06F 17/2785; G06F 17/30011; G06F 17/30312; G06F 17/30554; G06F 17/30707; G06F 17/30716; G06F 17/30873; G06F 17/30899; G06F 17/30991

USPC ... 707/999.005, 999.004, 999.007, 723, 722, 707/728, 731, 736, 737, 750

See application file for complete search history.

(56) References Cited

U.S. PATENT DOCUMENTS

| 5,918,236 A | * | 6/1999 | Wical | G06F 17/274 704/1 |
| 6,701,329 B1 | * | 3/2004 | Esibov | H04L 29/12066 |
| 6,757,723 B1 | * | 6/2004 | O'Toole | G06K 13/0825 709/222 |
| 7,305,380 B1 | | 12/2007 | Hoelzle et al. | |
| 7,421,432 B1 | | 9/2008 | Hoelzle et al. | |
| 8,209,331 B1 | * | 6/2012 | Garg | G06F 17/30067 707/734 |
| 8,214,361 B1 | * | 7/2012 | Sandler | 707/732 |

(Continued)

*Primary Examiner* — Dennis Truong
(74) *Attorney, Agent, or Firm* — Fish & Richardson P.C.

(57) ABSTRACT

A server is configured to receive, from a client, a query and context information associated with a document; obtain search results, based on the query, that identify documents relevant to the query; analyze the context information to identify content; generate first scores for a hierarchy of topics, that correspond to measures of relevance of the topics to the content; select a topic that is most relevant to the context information when the topic is associated with a greatest first score; generate second scores for the search results that correspond to measures of relevance, of the search results, to the topic; select one or more of the search results as being most relevant to the topic when the search results are associated with one or more greatest second scores; generate a search result document that includes the selected search results; and send, to a client, the search result document.

12 Claims, 8 Drawing Sheets

(56) References Cited

U.S. PATENT DOCUMENTS

| | | | |
|---|---|---|---|
| 8,224,857 B2* | 7/2012 | Doganata | G06F 17/30867 707/791 |
| 8,498,984 B1* | 7/2013 | Hwang | G06F 17/30864 707/723 |
| 8,515,972 B1* | 8/2013 | Srikrishna | G06F 17/30864 707/750 |
| 8,762,368 B1 | 6/2014 | Duddu et al. | |
| 2002/0078045 A1* | 6/2002 | Dutta | G06F 17/30675 |
| 2003/0018659 A1* | 1/2003 | Fuks | G06F 17/30646 715/230 |
| 2003/0195877 A1* | 10/2003 | Ford | G06F 17/30705 |
| 2004/0220902 A1* | 11/2004 | Gates | G06F 17/30864 |
| 2009/0240674 A1* | 9/2009 | Wilde | G06F 17/30899 |
| 2010/0036830 A1* | 2/2010 | Lee | G06F 17/30967 707/708 |
| 2010/0121842 A1* | 5/2010 | Klinkott | G06F 17/30905 707/722 |
| 2010/0185623 A1* | 7/2010 | Lu | G06F 17/30864 707/748 |
| 2010/0281417 A1* | 11/2010 | Yolleck | G06F 17/30873 715/779 |
| 2011/0093488 A1* | 4/2011 | Amacker | G06F 17/30873 707/767 |
| 2011/0153595 A1* | 6/2011 | Bernstein | G06Q 10/107 707/722 |
| 2011/0252025 A1* | 10/2011 | Jin | G06F 17/30864 707/725 |
| 2012/0158724 A1 | 6/2012 | Mahadevan et al. | |
| 2013/0080430 A1* | 3/2013 | Vandermolen | G06F 17/30867 707/736 |
| 2013/0080460 A1* | 3/2013 | Tomko | G06F 17/30864 707/767 |
| 2013/0212089 A1* | 8/2013 | Lederer | G06F 17/30424 707/723 |

* cited by examiner

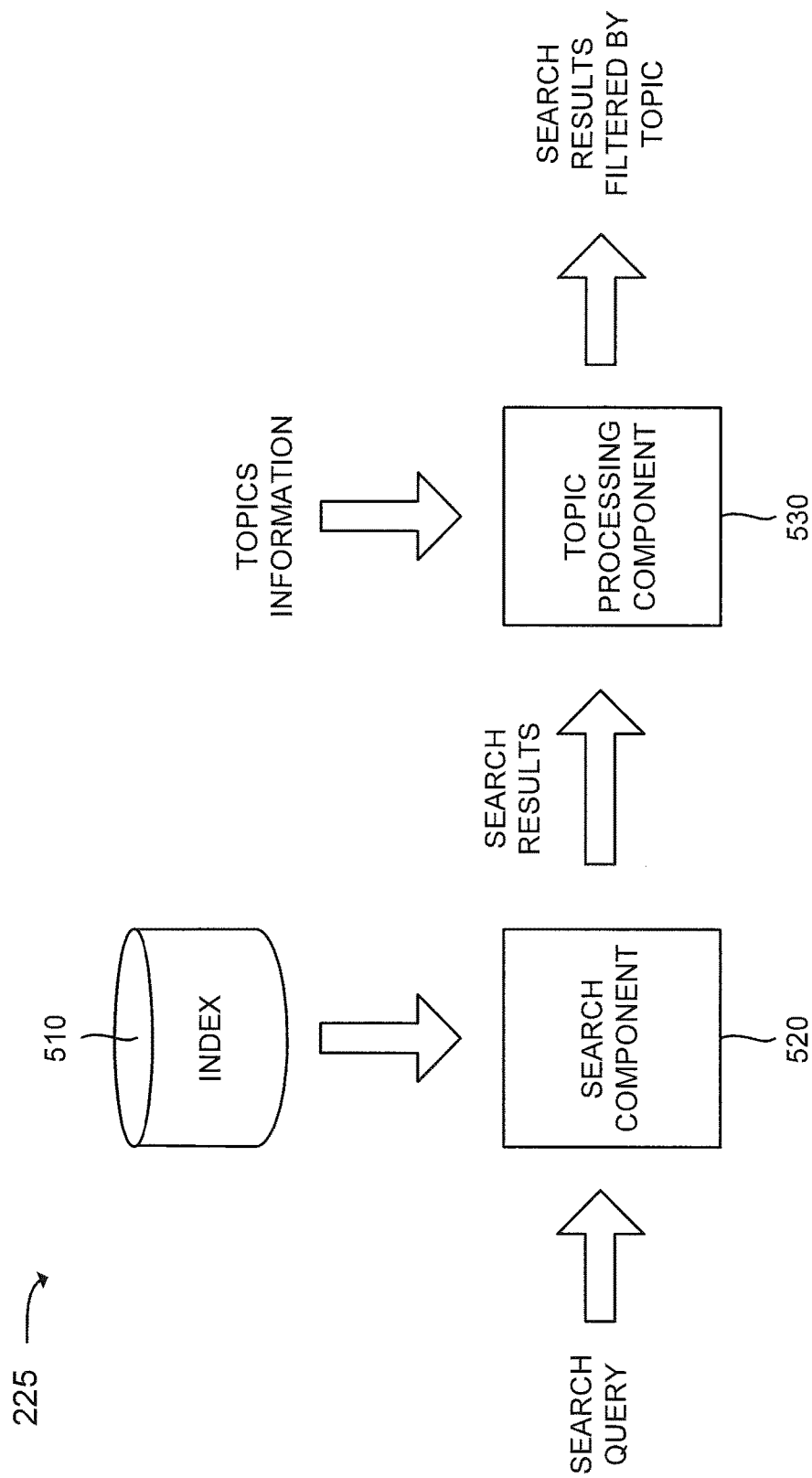

CONTEXT-BASED FILTERING OF SEARCH RESULTS

CROSS-REFERENCE TO RELATED APPLICATIONS

This application is a continuation of U.S. application Ser. No. 14/310,594, filed Jun. 20, 2014, which is a continuation of U.S. application Ser. No. 13/459,540, filed Apr. 30, 2012, now U.S. Pat. No. 8,762,368, the contents of each of which are incorporated by reference herein.

BACKGROUND

Many techniques are available to users today to find information on the World Wide Web ("web"). For example, users often use web browsers and/or search systems to find information of interest.

Search systems provide search results in response to a search query from a user. The search results are often presented in a ranked list, based on the search query from the user. The ranked list of search results may be associated with a variety of different topics. The ranked list of search results may include search results associated with a topic that the user does not find useful and/or did not intend to be included within the ranked list of search results.

SUMMARY

According to one possible implementation, a method may include receiving, by at least one of one or more server devices and from a client, a search query and context information associated with a document identified by the client; obtaining, by at least one of the one or more server devices, search results based on the search query, where the search results may identify documents relevant to the search query; and analyzing, by at least one of the one or more server devices, the context information to identify content. The method may also include generating, by at least one of the one or more server devices, a group of first scores for a hierarchy of topics, where each first score, of the group of first scores, may correspond to a respective measure of relevance of each topic, of the hierarchy of topics, to the content; and selecting, by at least one of the one or more server devices, a topic, of the hierarchy of topics, as being most relevant to the context information when the topic is associated with a greatest first score of the group of first scores. The method may further include generating, by at least one of the one or more server devices, a group of second scores for the search results, where each second score, of the group of second scores, may correspond to a respective measure of relevance, of each of the search results, to the topic. The method may still further include selecting, by at least one of the one or more server devices, one or more of the search results as being most relevant to the topic when the one or more of the search results are associated with one or more greatest second scores, of the group of second scores; generating, by at least one of the one or more server devices, a search result document that includes the selected one or more search results; and sending, to the client, the search result document.

Additionally, where analyzing the context information to identify content may include receiving, as the context information, uploading of the document from the client; and analyzing the document to identify the content.

Additionally, where analyzing the context information to identify content may further include receiving, as the context information, an address associated with another server device; obtaining, using the address, a document from the other server device; and analyzing the document to identify the content.

Additionally, the method may include ranking the search results based on the respective measure of relevance, of each of the search results, to the search query; selecting a set of the search results that are ranked above a threshold; and determining the measure of relevance, of the selected set of the search results, to the topic.

Additionally, the method may include determining whether the greatest first score is greater than a threshold; sending, to the client, a search result document, that includes the search results based on the search query, when the greatest first score is not greater than the threshold; and sending, to the client, the search result document, that includes the selected one or more of the search results, when the greatest first score is greater than the threshold.

Additionally, the method may include determining whether the greatest first score is greater than a next-greatest first score, of the group of first scores, by an amount that is greater than a threshold; sending, to the client, a search result document, that includes the search results based on the search query, when the greatest first score is not greater than the next-greatest first score by the amount that is greater than the threshold; and sending, to the client, the search result document, that includes the selected one or more of the search results, when the greatest first score is greater than the next-greatest first scores by the amount that is greater than the threshold.

Additionally, the method may include determining whether a greatest second score, of the group of second scores, is greater than a threshold; providing, to the client, the search results, based on the search query, when the greatest second score is not greater than the threshold; and providing, to the client, the selected one or more search results when the greatest second score is greater than the threshold.

Additionally, the method may include determining whether the greatest first score is approximately equal to at least another first score of the group of first scores; classifying the context information as being relevant to a first topic of the hierarchy of topics and at least a second topic, of the hierarchy of topics, when the greatest first score is approximately equal to at least the other first score; sending, to the client, a search result document that includes a first portion of the search results that are selected based on measures of relevance to the first topic, and a second portion of the search results that are selected based on measures of relevance to at least the second topic; classifying the context information as being relevant to the first topic when the greatest first score is not approximately equal to at least the other first score; and sending, to the client, the search result document that includes the selected one or more search results that are selected based on measures of relevance to the first topic.

Additionally, where generating the group of first scores may further include identifying a respective quantity of terms, within the content, that matches each topic and subtopic of the hierarchy of topics; assigning scores to each topic based on the respective quantity of terms that matches each of the topics and subtopics; generating a respective combined score, for each of the topics, based on a combination of a respective first one of the scores assigned to each topic and one or more respective second ones of the scores assigned to each subtopic that is associated with the each topic; identifying the topic with a greatest combined score, of the respective combined score for each other topic of the hierarchy of topics; and sending, to the client, the search result document that includes the selected one or more search results that are relevant to the topic with the greatest combined score.

In another possible implementation, a computer-readable medium may include a group of instructions, which when executed by one or more processors, cause the one or more processors to receive a search query and context information associated with a document identified by the client; obtain search results based on the search query, the search results may identify documents relevant to the search query; analyze the context information to identify content; and generate a group of first scores for a hierarchy of topics, each first score, of the group of first scores, may correspond to a respective measure of relevance of each topic, of the hierarchy of topics, to the content. The group of instructions may further cause the one or more processors to select a topic, of the hierarchy of topics, as being most relevant to the context information when the topic is associated with a greatest first score of the group of first scores; and generate a group of second scores for the search results, each second score, of the group of second scores, may correspond to a respective measure of relevance, of each of the search results, to the topic. The group of instructions may further cause the one or more processors to select one or more of the search results as being most relevant to the topic when the one or more of the search results are associated with one or more greatest second scores, of the group of second scores; generate a search result document that includes the selected one or more search results; and send the search result document to the client.

Additionally, where one or more instructions, of the group of instructions, to analyze the context information to identify content, may cause the one or more processors to receive, as the context information, uploading of the document from the client; and analyze the document to identify the content.

In yet another possible implementation, a system may include one or more server devices to receive a search query and context information associated with a document identified by the client; obtain search results based on the search query, the search results identifying documents relevant to the search query; analyze the context information to identify content; and generate a group of first scores for a hierarchy of topics, each first score, of the group of first scores, corresponding to a respective measure of relevance of each topic, of the hierarchy of topics, to the content. The system may also include the one or more server devices to select a topic, of the hierarchy of topics, as being most relevant to the context information when the topic is associated with a greatest first score of the group of first scores; and generate a group of second scores for the search results, each second score, of the group of second scores, may correspond to a respective measure of relevance, of each of the search results, to the topic. The system may further include the one or more server devices to select one or more of the search results as being most relevant to the topic when the one or more of the search results are associated with one or more greatest second scores, of the group of second scores; generate a search result document that includes the selected one or more search results; and send the search result document to the client.

Additionally, where, when analyzing the context information to identify content, the one or more server devices may receive, as the context information, uploading of the document from the client; and analyze the document to identify the content.

Additionally, where, when analyzing the context information to identify content, the one or more server devices may receive, as the context information, an address associated with another server device; obtain, using the address, a document from the other server device; and analyze the document to identify the content.

Additionally, the one or more server devices may rank the search results based on the respective measure of relevance, of each of the search results, to the search query; select a set of the search results that are ranked above a threshold; and determine the measure of relevance, of the selected set of the search results, to the topic.

Additionally, where, when classifying the context information, the one or more server devices may determine whether the greatest first score is greater than a threshold; send, to the client, a search result document, that includes the search results based on the search query, when the greatest first score is not greater than the threshold; and send, to the client, the search result document, that includes the selected one or more of the search results, when the greatest first score is greater than the threshold.

Additionally, the one or more server devices may determine whether the greatest first score is greater than a next-greatest first score, of the group of first scores, by an amount that is greater than a threshold; send, to the client, a search result document, that includes the search results based on the search query, when the greatest first score is not greater than the next-greatest first score by the amount that is greater than the threshold; and send, to the client, the search result document, that includes the selected one or more of the search results, when the greatest first score is greater than the next-greatest first scores by the amount that is greater than the threshold.

Additionally, the one or more server devices may determine whether a greatest second score, of the group of second scores, is greater than a threshold; provide, to the client, the search results, based on the search query, when the greatest second score is not greater than the threshold; and provide, to the client, the selected one or more search results when the greatest second score is greater than the threshold.

Additionally, the one or more server devices may determine whether the greatest first score is approximately equal to at least another first score of the group of first scores; classify the context information as being relevant to a first topic of the hierarchy of topics and at least a second topic, of the hierarchy of topics, when the greatest first score is approximately equal to at least the other first score; send, to the client, a search result document that includes a first portion of the search results that are selected based on measures of relevance to the first topic, and a second portion of the search results that are selected based on measures of relevance to at least the second topic; classify the context information as being relevant to the first topic when the greatest first score is not approximately equal to at least the other first score; and send, to the client, the search result document that includes the selected one or more search results that are selected based on measures of relevance to the first topic.

Additionally, where, when generating the group of first scores, the one or more server devices may identify a respective quantity of terms, within the content, that matches each topic and subtopic of the hierarchy of topics; assign scores to each topic based on the respective quantity of terms that matches each of the topics and subtopics; generate a respective combined score, for each of the topics, based on a combination of a respective first one of the scores assigned to each topic and one or more respective second ones of the scores assigned to each subtopic that is associated with the each topic; identify the topic with a greatest combined score, of the respective combined score for each other topic of the hierarchy of topics; and send, to the client, the search result document that includes the selected one or more search results that are relevant to the topic with the greatest combined score.

BRIEF DESCRIPTION OF THE DRAWINGS

The accompanying drawings, which are incorporated in and constitute a part of this specification, illustrate one or more embodiments described herein and, together with the description, explain these embodiments. In the drawings:

FIG. 5A is a diagram of example functional components of a search system of FIG. 1;

DETAILED DESCRIPTION

The following detailed description refers to the accompanying drawings. The same reference numbers in different drawings may identify the same or similar elements.

A system and/or method, as described herein, may filter search results based on one or more topics to assist users in finding search results of interest. The one or more topics may be based on context information and a search query provided by the user. The context information may include a link, such as, a uniform resource locator (URL); a document and/or webpage to which the link corresponds, a snippet of text from the document, etc. As a result of the filtering, users may be able to locate particular search results, associated with the one or more topics in which the users are interested, thereby improving the users' search experience.

A search result, as the term is used herein, is to be broadly interpreted to include any reference to a document that is responsive to a search query. A search result commonly includes a title of the document and a link to, or an address of, the document, and may also include a snippet of text from the document. A document, as the term is used herein, is to be broadly interpreted to include any machine-readable and machine-storable work product. A document may include, for example, an e-mail, a web site, a file, a combination of files, one or more files with embedded links to other files, a news article, a blog, an image, a discussion group forum, etc. In the context of the Internet, a common document is a web page. Web pages often include textual information and may include embedded information, such as meta information, images, hyperlinks, etc., and/or embedded instructions, such as Javascript. A link, as the term is used herein, is to be broadly interpreted to include any reference to/from a document from/to another document or another part of the same document.

Figure 1A:
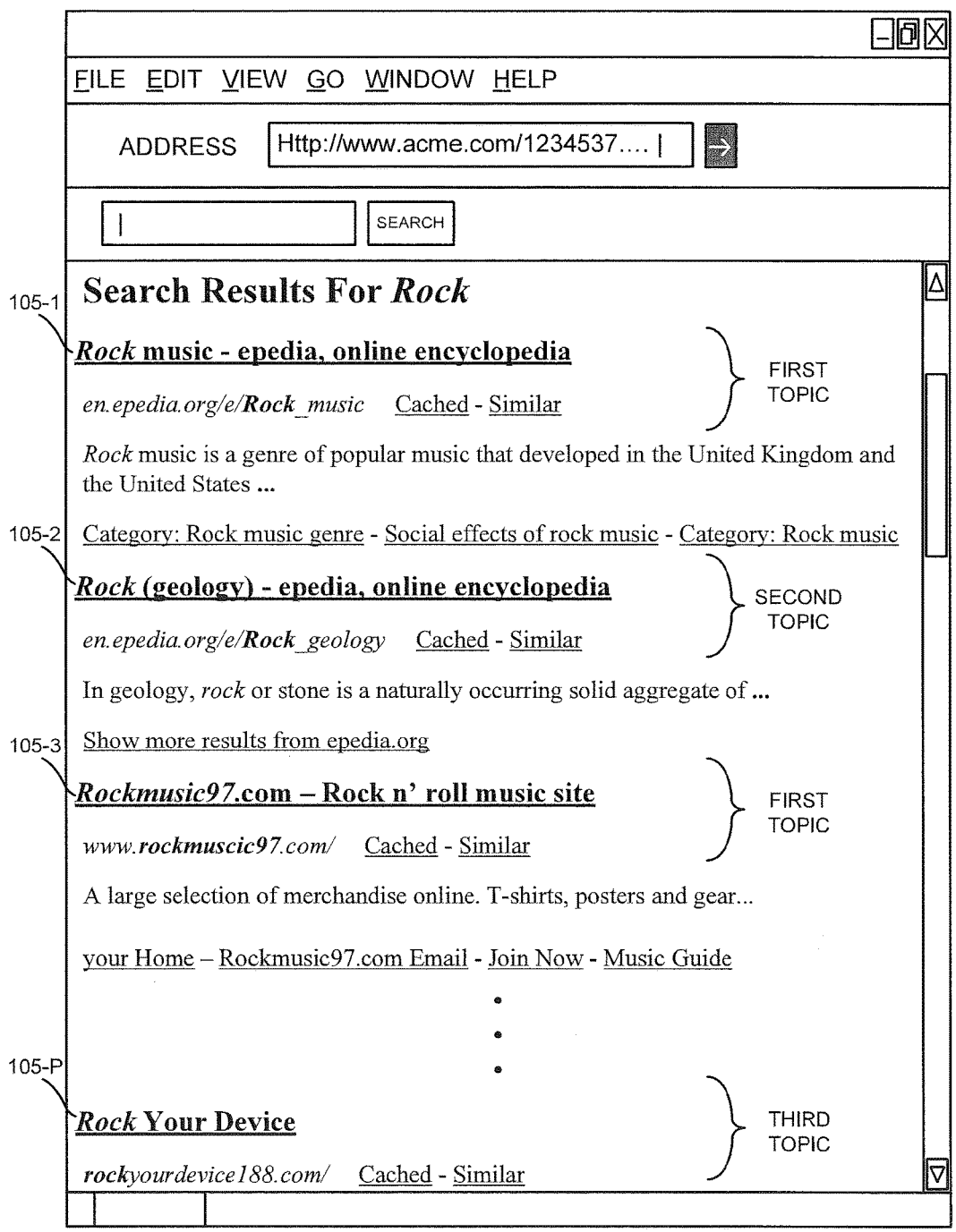
FIGS. 1A and 1B are diagrams illustrating an overview of an example implementation described herein.
Figure 1B:
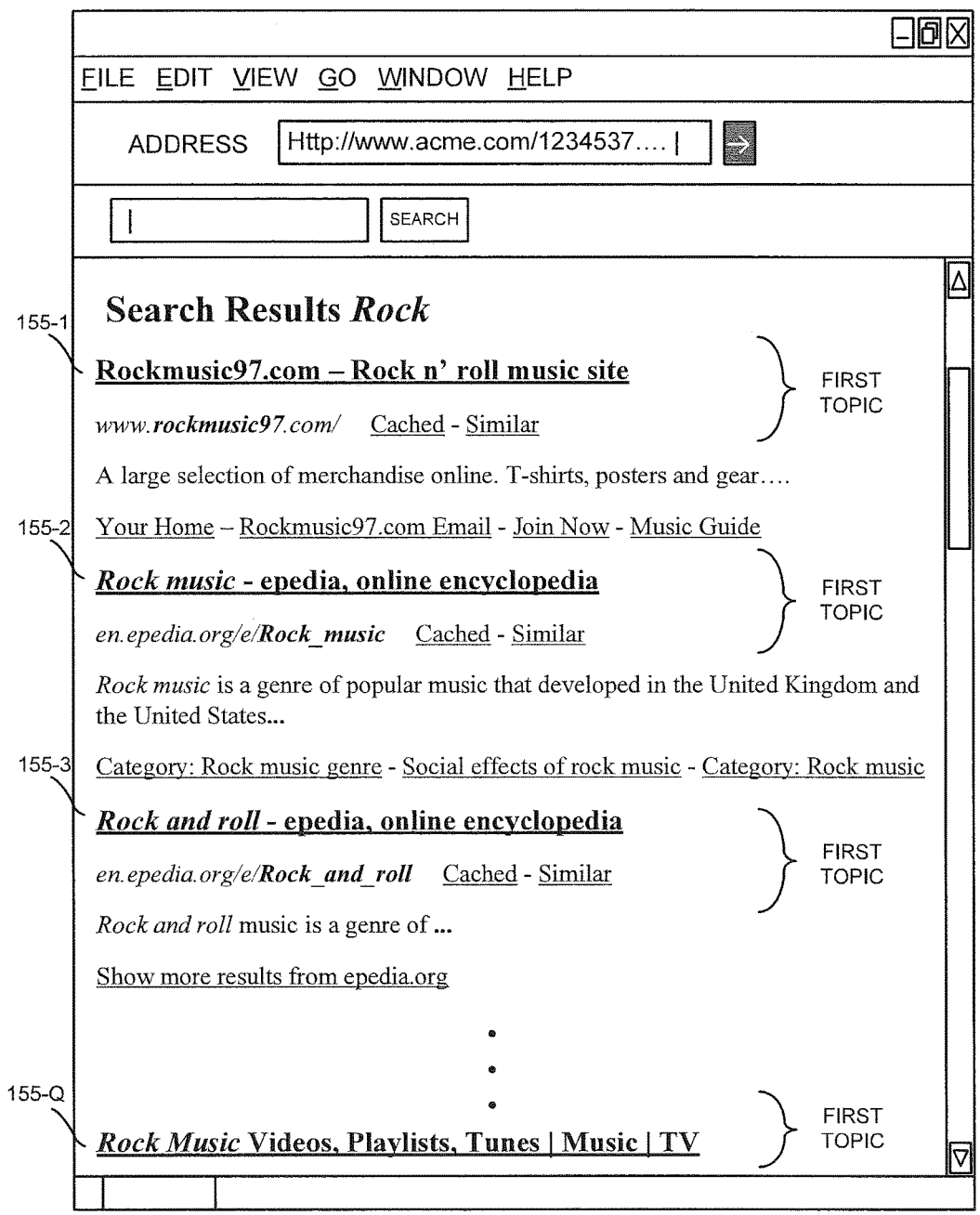

FIGS. 1A and 1B are diagrams illustrating an overview of an example implementation described herein. Assume, for the example implementation described with respect to FIGS. 1A and 1B, that a user desires a search result relating to the search query "rock." The user may use a web browser to access a search system and provide, to the search system, the search query "rock." The user may instruct the search system to perform a search, based on the search query, by selecting a search button. In response to the search query, the search system may perform a search of one or more indexes and identify documents, as search results, that are relevant to the search query. The search results may be associated with different topics and/or subtopics of search results that are relevant to the search query. The search system may generate scores for the search results based on a measure of relevance of the search results. The search system may generate a list of search results and provide the list of search results for display, to the user, via the web browser.

FIG. 1A illustrates an example conventional search results document 100 (hereinafter referred to as a "search results document 100") that may be provided by a search system. FIG. 1A may represent prior art. As shown in FIG. 1A, search results document 100 includes a list of search results 105-1, . . . , 105-P (where P≥1) (hereinafter referred to collectively as "search results 105" and individually as "search result 105"). Generally, the search system may order the list of search results 105, based on the scores, to form search results document 100. Search results document 100 may correspond to a mixture of different topics to which the list of search results 105 correspond.

Each search result 105 may correspond to a respective link that, when selected by a user, causes a document, such as, for example, a web page, a text page, etc., to be obtained and/or displayed. Each search result 105 may also, or alternatively, correspond to a first topic, a second topic, a third topic, and/or some other topic. For example, the first topic may be associated with rock music. Additionally, or alternatively, the second topic may be associated with rocks, in a geological context. Additionally, or alternatively, the third topic may be associated with rock as a verb, such as in a context associated with performing some act.

Search results 105 may be ordered based on the scores, and irrespective of the topics. For example, as shown in FIG. 1A, a first search result 105, e.g., search result 105-1, associated with the first topic, may be followed by a second search result 105, e.g., search result 105-2, associated with the second topic; second search result 105 may be followed by a third search result 105, e.g., search result 105-3, associated with the first topic; and third search result 105 may be followed by one or more other search results 105, e.g., search result 105-P associated with the third topic, etc. The user may browse the list of search results 105 to locate one or more search results 105 associated with a particular topic in which the user is interested, and then locate a particular search result 105, of that particular topic, in which the user is interested.

FIG. 1B illustrates an example search results document 150 that may be provided by a search system. As shown in FIG. 1B, search results document 150 includes a list of search results 155-1, . . . , 155-Q (where Q≥1) (hereinafter referred to collectively as "search results 155" and individually as "search result 155"). Each search result 155 may correspond to a respective link that, when selected by a user, causes a document, such as, for example, a web page, a text page, etc., to be obtained and/or displayed.

For example, the search system may assign search results 155 to topics and score the topics based on context information and/or the search query. The search system may also, or alternatively, provide search results 155 that correspond to one or more topics associated with one or more highest scores, of the scores of the topics, to form the list of search results 155. For example, the search system may assign a first score to a first topic associated with rock music. The first score may be based on how relevant the first topic is to context information obtained from, for example, a document identified by a user. The search system may also, or alternatively, assign a second score to a second topic, associated with a rock in a geological context, based on how relevant the second topic is to the context information. The search system may assign other scores to other topics based on how relevant the other topics are to the context information. The search system may select a topic associated with a highest score which identifies the selected topic as being most relevant to the context information.

By way of example, as shown in FIG. 1B, the list of search results 155 may be associated with the selected topic, such as the first topic associated with rock music, that is most relevant to the context information. Search results 155, associated with the selected topic, may be listed in an order of relevance to the search query. As a result, the user may be provided search results document 150, associated with a topic in which the user is interested, and may more easily locate a particular search result 155. This may improve the user's search experience.

Figure 2:
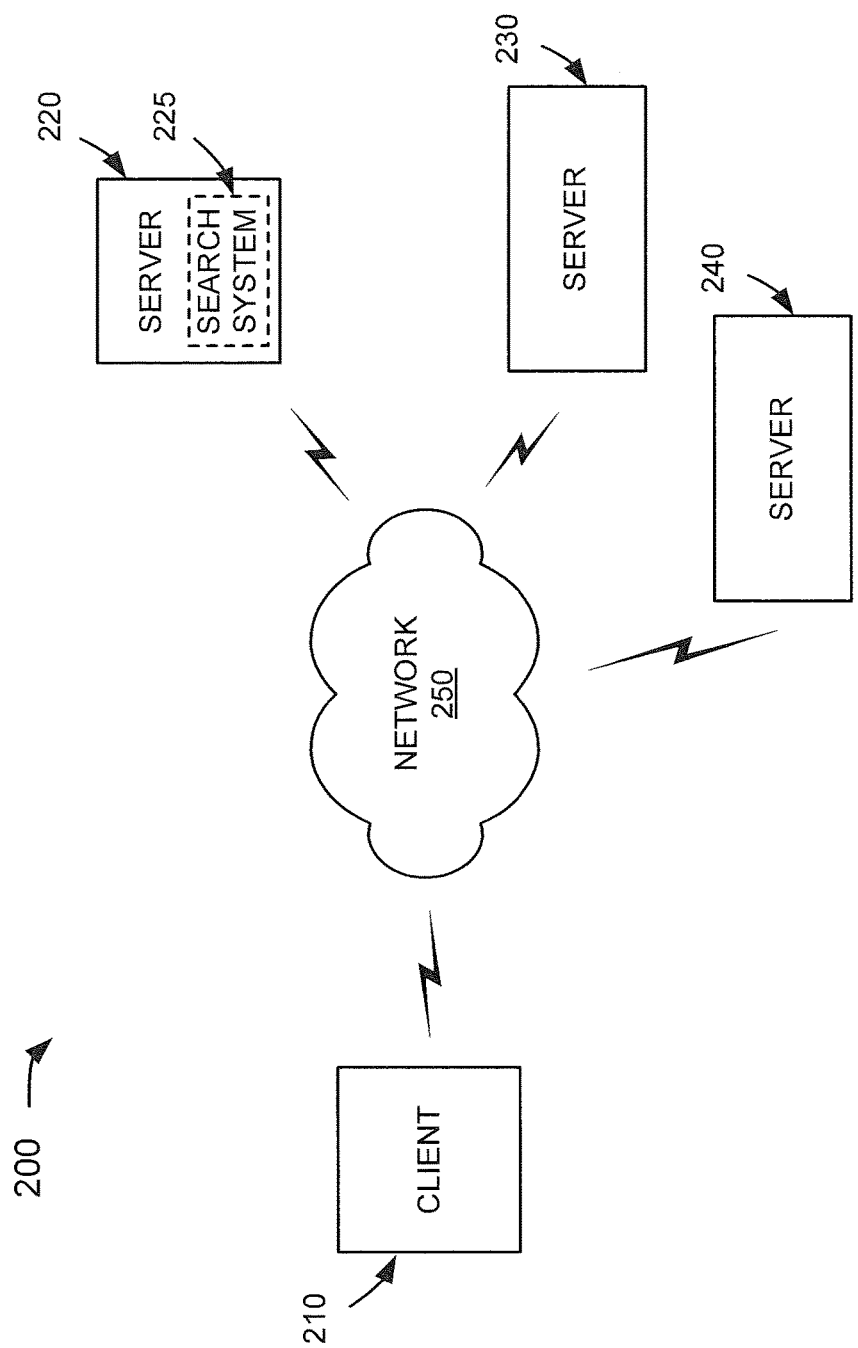
FIG. 2 is a diagram of an example environment in which systems and/or methods described herein may be implemented.

FIG. 2 is a diagram of an example environment 200 in which systems and/or methods described herein may be implemented. Environment 200 includes client 210 connected to multiple servers 220, 230, and 240 via a network 250. One client 210 and three servers 220, 230, and 240 have been illustrated as connected to network 250 for simplicity. In practice, environment 200 may include additional clients, networks, and/or servers; fewer clients, networks, and/or servers; different clients, networks, and/or servers; or differently arranged clients and/or servers than are shown in environment 200. Also, in some instances, a client may perform a function of a server, and a server may perform a function of a client.

Client 210 may include a client device, such as personal computer, a wireless telephone, a personal digital assistant ("PDA"), a laptop, a tablet computer, or another type of computation or communication device. Client 210 may include user interfaces presented through one or more browsers (e.g., web browsers, such as Chrome™).

Servers 220, 230, and 240 may include server devices that gather, process, search, and/or perform functions in a manner described herein. Each server 220, 230, or 240 may be implemented as a single server device or a collection of server devices that may be co-located or remotely located. Additionally, or alternatively, any two or more of servers 220, 230, and 240 may be implemented within a single, common server device or a single, common collection of server devices. While servers 220, 230, and 240 are shown as separate components, it may be possible for one or more of servers 220, 230, and/or 240 to perform one or more of the functions of another one or more of servers 220, 230, and/or 240.

As shown in FIG. 2, server 220 may implement a search system 225 that receives a search query from client 210, and that provides a list of search results that are responsive to the search query. Server 220 may crawl a corpus of documents (e.g., web documents), index the documents, and store information associated with the documents in a repository of documents. Servers 230 and 240 may store or maintain documents that may be crawled or analyzed by server 220.

Network 250 may include any type of network, such as a local area network ("LAN"), a wide area network ("WAN"), a telephone network, such as the Public Switched Telephone Network ("PSTN") or a cellular network, an intranet, the Internet, or a combination of networks. Client 210 and servers 220, 230, and 240 may connect to network 250 via wired and/or wireless connections. In other words, any one of client 210 and servers 220, 230, and 240 may connect to network 250 via a wired connection, a wireless connection, or a combination of a wired connection and a wireless connection.

Figure 3:
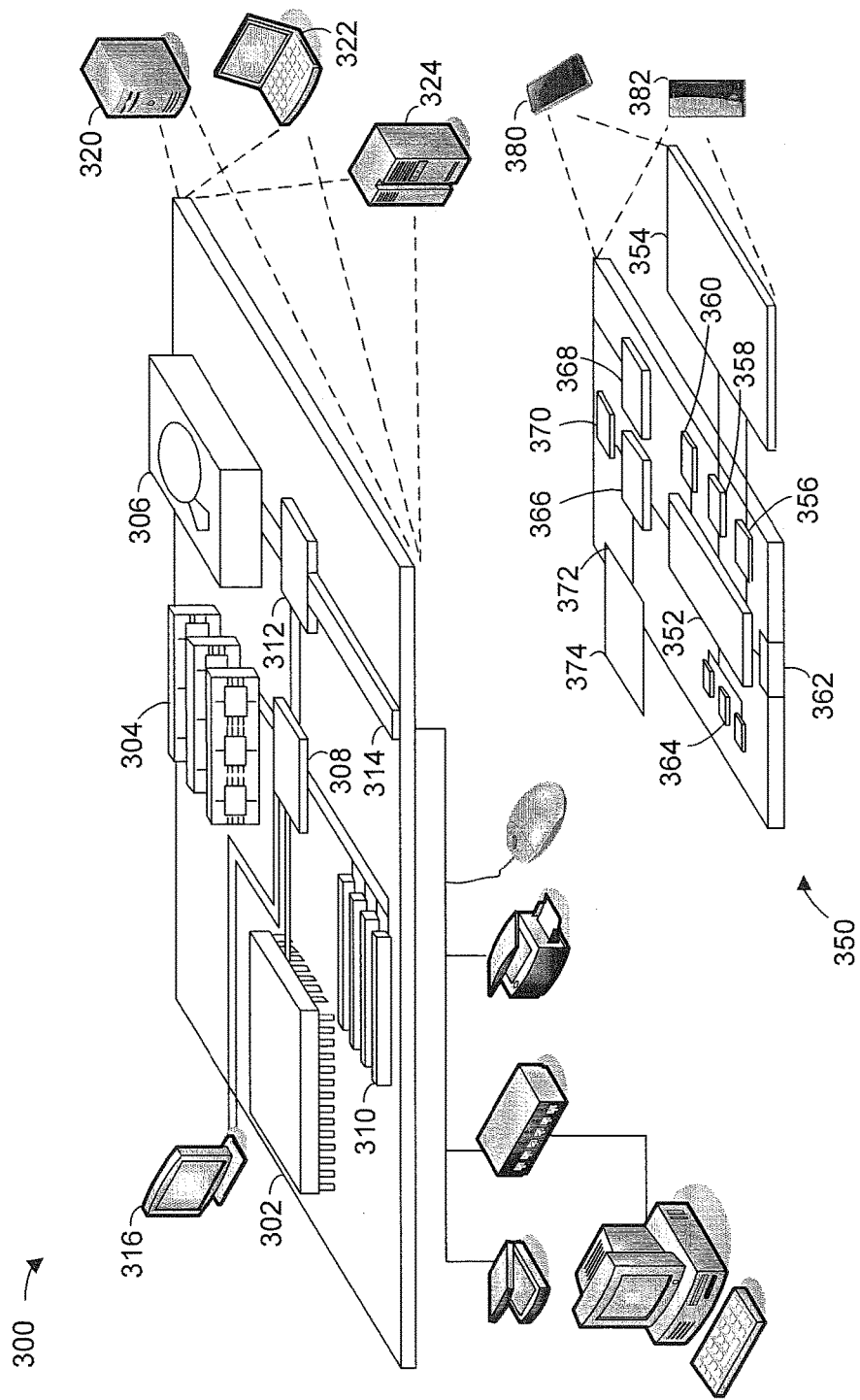
FIG. 3 is a diagram of an example of a generic computer device and a generic mobile computer device.

FIG. 3 is a diagram of an example of a generic computing device 300 and a generic mobile computing device 350, which may be used with the techniques described here. Generic computing device 300 or generic mobile computing device 350 may correspond to, for example, a client 210 and/or a server 220, 230, or 240. Computing device 300 is intended to represent various forms of digital computers, such as laptops, desktops, workstations, personal digital assistants, servers, blade servers, mainframes, and other appropriate computers. Mobile computing device 350 is intended to represent various forms of mobile devices, such as personal digital assistants, cellular telephones, smart phones, and other similar computing devices. The components shown in FIG. 3, their connections and relationships, and their functions, are meant to be examples only, and are not meant to limit implementations described herein.

Computing device 300 includes a processor 302, a memory 304, a storage device 306, a high-speed interface 308 connecting to memory 304 and high-speed expansion ports 310, and a low speed interface 312 connecting to low speed bus 314 and storage device 306. Each of the components 302, 304, 306, 308, 310, and 312, are interconnected using various busses, and may be mounted on a common motherboard or in other manners as appropriate. Processor 302 can process instructions for execution within the computing device 300, including instructions stored in the memory 304 or on the storage device 306 to display graphical information for a graphical user interface (GUI) on an external input/output device, such as display 316 coupled to high speed interface 308. In other implementations, multiple processors and/or multiple buses may be used, as appropriate, along with multiple memories and types of memory. Also, multiple computing devices 300 may be connected, with each device providing portions of the necessary operations, as a server bank, a group of blade servers, or a multi-processor system, etc.

Memory 304 stores information within the computing device 300. In one implementation, memory 304 includes a volatile memory unit or units. In another implementation, memory 304 includes a non-volatile memory unit or units. The memory 304 may also be another form of computer-readable medium, such as a magnetic or optical disk. A computer-readable medium may refer to a non-transitory memory device. A memory device may refer to storage space within a single storage device or spread across multiple storage devices.

The storage device 306 is capable of providing mass storage for the computing device 300. In one implementation, storage device 306 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described herein. The information carrier is a computer or machine-readable medium, such as memory 304, storage device 306, or memory on processor 302.

High speed controller 308 manages bandwidth-intensive operations for the computing device 300, while low speed controller 312 manages lower bandwidth-intensive operations. Such allocation of functions is provided for explanatory purposes only. In one implementation, high-speed controller 308 is coupled to memory 304, display 316 (e.g., through a graphics processor or accelerator), and to high-speed expansion ports 310, which may accept various expansion cards (not shown). In this implementation, low-speed controller 312 is coupled to storage device 306 and low-speed expansion port 314. The low-speed expansion port, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

Computing device 300 may be implemented in a number of different forms, as shown in the figure. For example, it may be implemented as a standard server 320, or multiple times in a group of such servers. It may also be implemented as part of a rack server system 324. In addition, it may be implemented in a personal computer such as a laptop computer 322. Alternatively, components from computing device 300 may be combined with other components in a mobile device (not shown), such as mobile computing device 350. Each of such devices may contain one or more of computing devices 300, 350, and an entire system may be made up of multiple computing devices 300, 350 communicating with each other.

Mobile computing device 350 includes a processor 352, memory 364, an input/output ("I/O") device such as a display 354, a communication interface 366, and a transceiver 368, among other components. Mobile computing device 350 may also be provided with a storage device, such as a micro-drive or other device, to provide additional storage. Each of the components 350, 352, 364, 354, 366, and 368 are interconnected using various buses, and several of the components may be mounted on a common motherboard or in other manners as appropriate.

Processor 352 can execute instructions within mobile computing device 350, including instructions stored in memory 364. Processor 352 may be implemented as a chipset of chips that include separate and multiple analog and digital processors. Processor 352 may provide, for example, for coordination of the other components of mobile computing device 350, such as control of user interfaces, applications run by mobile computing device 350, and wireless communication by mobile computing device 350.

Processor 352 may communicate with a user through control interface 358 and display interface 356 coupled to a display 354. Display 354 may be, for example, a TFT LCD (Thin-Film-Transistor Liquid Crystal Display) or an OLED (Organic Light Emitting Diode) display, or other appropriate display technology. Display interface 356 may comprise appropriate circuitry for driving display 354 to present graphical and other information to a user. Control interface 358 may receive commands from a user and convert them for submission to the processor 352. In addition, an external interface 362 may be provide in communication with processor 352, so as to enable near area communication of mobile computing device 350 with other devices. External interface 362 may provide, for example, for wired communication in some implementations, or for wireless communication in other implementations, and multiple interfaces may also be used.

Memory 364 stores information within mobile computing device 350. Memory 364 can be implemented as one or more of a computer-readable medium or media, a volatile memory unit or units, or a non-volatile memory unit or units. Expansion memory 374 may also be provided and connected to mobile computing device 350 through expansion interface 372, which may include, for example, a SIMM (Single In Line Memory Module) card interface. Such expansion memory 374 may provide extra storage space for device 350, or may also store applications or other information for mobile computing device 350. Specifically, expansion memory 374 may include instructions to carry out or supplement the processes described above, and may include secure information also. Thus, for example, expansion memory 374 may be provide as a security module for mobile computing device 350, and may be programmed with instructions that permit secure use of device 350. In addition, secure applications may be provided via the SIMM cards, along with additional information, such as placing identifying information on the SIMM card in a non-hackable manner.

Expansion memory 374 may include, for example, flash memory and/or NVRAM memory. In one implementation, a computer program product is tangibly embodied in an information carrier. The computer program product contains instructions that, when executed, perform one or more methods, such as those described above. The information carrier is a computer- or machine-readable medium, such as the memory 364, expansion memory 374, or memory on processor 352, that may be received, for example, over transceiver 368 or external interface 362.

Mobile computing device 350 may communicate wirelessly through communication interface 366, which may include digital signal processing circuitry where necessary. Communication interface 366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 368. In addition, short-range communication may occur, such as using a Bluetooth, WiFi, or other such transceiver (not shown). In addition, GPS (Global Positioning System) receiver module 370 may provide additional navigation- and location-related wireless data to mobile computing device 350, which may be used as appropriate by applications running on mobile computing device 350.

Mobile computing device 350 may also communicate audibly using audio codec 360, which may receive spoken information from a user and convert it to usable digital information. Audio codec 360 may likewise generate audible sound for a user, such as through a speaker, e.g., in a handset of mobile computing device 350. Such sound may include sound from voice telephone calls, may include recorded sound (e.g., voice messages, music files, etc.) and may also include sound generated by applications operating on mobile computing device 350.

Mobile computing device 350 may be implemented in a number of different forms, as shown in the figure. For example, it may be implemented as a cellular telephone 380. It may also be implemented as part of a smart phone 382, personal digital assistant, or other similar mobile device.

Various implementations of the systems and techniques described herein can be realized in digital electronic circuitry, integrated circuitry, specially designed ASICs (application specific integrated circuits), computer hardware, firmware, software, and/or combinations thereof. These various implementations can include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any apparatus and/or device (e.g., magnetic discs, optical disks, memory, Programmable Logic Devices ("PLDs")) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described herein can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described herein can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a LAN, a WAN, and the Internet.

Figure 4:
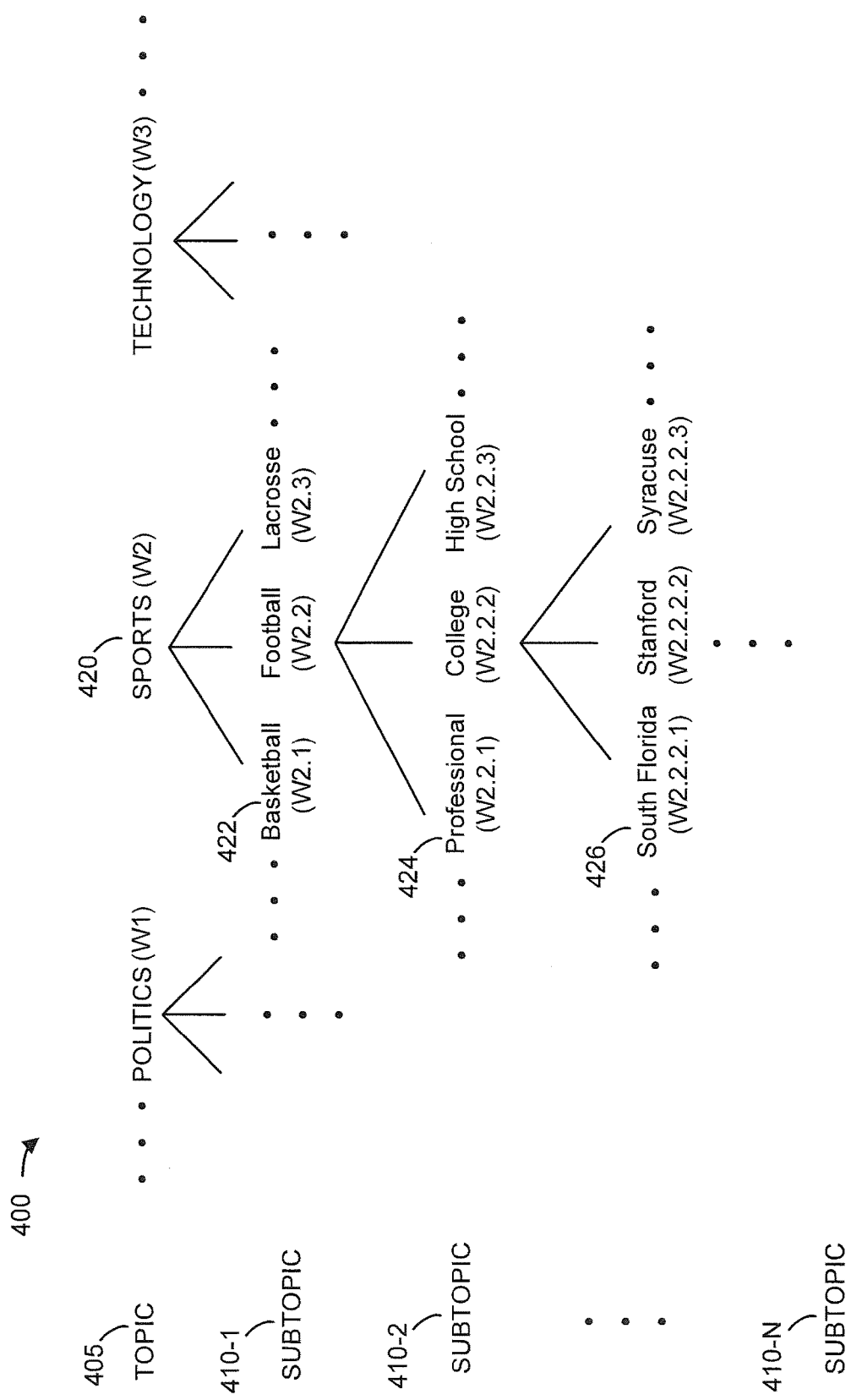
FIG. 4 is a diagram of an example hierarchy of topics and subtopics.

FIG. 4 is a diagram of an example hierarchy 400 of topics and subtopics. Hierarchy 400 may be stored in a data structure and/or memory associated with server 220. Hierarchy 400 includes a collection of topics and/or subtopics, such as topic 405 and/or a group of subtopics 410-1, . . . , 410-N (where N≥1) (hereinafter referred to collectively as "subtopic 410" and individually as "subtopics 410"). The quantity of topics and/or subtopics included within hierarchy 400 is provided for explanatory purposes only. In another implementation, there may be additional topics and/or subtopics, fewer topics and/or subtopics, different topics and/or subtopics, or differently arranged topics and/or subtopics than are shown in hierarchy 400.

Topic 405 may represent one or more different categories of subject matter. For example, topic 405 may include a collection of subject matter topics 420 that represent the different categories of subject matter. In one implementation, the different categories of subject matter may, for example, be obtained from The Open Directory Project, Yahoo! Directory, The World Wide Web Virtual Library, etc. Subject matter topics 420 may, for example, represent categories of subject matter associated with news, politics, sports, technology, etc. Each subject matter topic 420 may be associated with a topic weighting factor (W1, W2, W3, etc.) that represents a value to be used to influence an impact of a measure of relevancy of a particular subject matter topic 420 to context information. The weighting factors may be predetermined by an operator associated with server 220. In one example, the weighting factors may be determined based on a measure of relative popularity of each of subject matter topics 420. In this example, if subject matter topic 420, associated with sports, is more popular that subject matter topic 420 associated with politics, e.g., based on a quantity of search results relating to the topic, a quantity of searches relating to the topic, a quantity of selections relating to the topic etc., then a weighting factor associated with sports may be greater than a weighting factor associated with politics, such as where $W1>W2$. In another example, the weighting factors may be determined based on a relative quantity of subject matter associated with each subject matter topic 420, such as a quantity of subtopics associated with subject matter topic 420, a quantity of documents associated with subject matter topic 420, etc. An operator may change the weighting factors over time as different subject matter topics increase and/or decrease in popularity, quantity of subject matter, etc. Additionally, or alternatively, a sum of the weighting factors, associated with subject matter topics 420, may be less than a first threshold, such as, for example, where $1 \leq W1+W2+W3$, etc. Determining the relevancy of a particular subject matter topic 420 to context information is described in detail below with respect to FIG. 6.

Subtopic 410 may represent different subcategories of subject matter that are related to the different categories of subject matter identified by topics 405. In one implementation, the different subcategories of subject matter may be obtained from The Open Directory Project, Yahoo! Directory, The World Wide Web Virtual Library, etc., For example, subtopic 410-1 may include a collection of subject matter subtopics 422 that represent the different subcategories of subject matter. Subtopic 410-1 may logically represent a child relative to topic 405 and topic 405 may logically represent a parent relative to subtopic 410-1. A particular set of subject matter subtopics 422 may correspond to particular subject matter topic 420. For example, subject matter topic 420, associated with sports, may include particular subject matter subtopics 422 associated with different subcategories of sports, such as basketball, football, lacrosse, etc.

In one implementation, each subject matter subtopic 422 may be associated with a first subtopic weighting factor (e.g., W2.1, W2.2, W2.3, etc., for the particular subject matter subtopics 422). The first subtopic weighting factor may represent a value to be used to determine an impact of a measure of relevancy of a subject matter subtopic 422 to context information. The subtopic weighting factors may be predetermined by the operator associated with server 220. In one example, the subtopic weighting factors may be determined based on a measure of relative popularity of each of subject matter subtopics 422 associated with a subject matter topic 420. In this example, if subject matter subtopic 422, associated with football, is more popular that subject matter subtopic 422 associated with basketball, then a subtopic weighting factor associated with football may be greater than the subtopic weighting factor associated with basketball, such as where W2.2>W2.1. In another example, the subtopic weighting factors may be determined based on a relative quantity of subject matter associated with each subject matter subtopic 422, such as a quantity of subtopics associated subject matter subtopic 422, a quantity of documents associated with subject matter subtopic 422, etc. Additionally, or alternatively, a sum of the subtopic weighting factors, associated with subject matter subtopics 422 that are children of a particular subject matter topic 420, may be less than a second threshold, such as, for example, where 1≤W2.1+W2.2+W2.3, etc. Determining the relevancy of a particular subject matter subtopic 422 to context information is described in detail below with respect to FIG. 6.

Additionally, or alternatively, subtopic 410-2 may include a collection of subject matter subtopics 424 that represent the different subcategories of subject matter. Subtopic 410-2 may logically represent a child relative to subtopic 410-1 or a grandchild relative to topic 405. Subtopic 410-1 may logically represent a parent relative to subtopic 410-2 and topic 405 may logically represent a grandparent relative to subtopic 410. A particular set of subject matter subtopics 424 may correspond to a particular subject matter subtopic 422. For example, subject matter subtopic 422, associated with football, may include particular subject matter subtopics 424 associated with different subcategories of football, such as professional, college, high school, etc.

In one implementation, each subject matter subtopic 424 may, in a manner similar to that described above, be associated with a second subtopic weighting factor (e.g., W2.2.1, W2.2.2, W2.2.3, etc.) predetermined by the operator associated with server 220. Additionally, or alternatively, a sum of the subtopic weighting factors, associated with subject matter subtopics 424 that are children of a particular subject matter subtopic 422, may be less than a third threshold, such as, for example, where 1≤W2.2.1+W2.2.2+W2.2.3, etc.

Hierarchy 400 may include additional logical layers of subtopic 410. For example, the particular subject matter subtopic 424, associated with college football may include subject matter subtopics 426 associated with different subcategories of college football, such college football teams associated with South Florida, Stanford, Syracuse, etc. Additionally, or alternatively, each subject matter subtopic 426 may, in a manner similar to that described above, be associated with a third subtopic weighting factor (e.g., W2.2.2.1, W2.2.2.2, W2.2.2.3, etc.) predetermined by the operator associated with server 220. Additionally, or alternatively, a sum of the subtopic weighting factors, associated with subject matter subtopics 424 that are children of a particular subject matter subtopic 422, may be less than a fourth threshold, such as, for example, where 1≤W2.2.2.1+W2.2.2.2+W2.2.2.3, etc.

Further subcategories associated with a particular college or university may include subcategories associated with football team statistics, facilities, players, coaches, finances, etc. and may have further subtopic weighting factors assigned in a manner similar to that described above.

FIG. 5A is a diagram of example functional components of search system 225. Each of the functional blocks, shown in FIG. 5A, may be implemented by one or more of the components described with regard to FIG. 3. As shown in FIG. 5A, search system 225 includes an index 510, a search component 520, and a topic processing component 530. In another implementation, search system 225 may include additional functional components, fewer functional components, different functional components, or differently arranged functional components than are illustrated in FIG. 5A.

Index 510 may represent one or more indexes that may be stored in one or more memory devices, which may be co-located or remotely located. Index 510 may store information associated with a collection of documents associated with one or more topics and/or subtopics. The collection of documents may include textual web documents, videos, audio recordings, images, or combinations of these types of documents. In one implementation, index 510 may store a keyword index associated with the documents. The keyword index may include an entry for each document associated with the index. Index 510 may be generated by server 220 crawling servers 230 and/or 240 to obtain information associated with the documents. Alternatively, or additionally, servers 230 and/or 240 may upload information associated with new documents, as the documents are published, to index 510.

Each entry in index 510 may store information identifying an address, such as a uniform resource locator (URL), uniform resource identifier (URI), Internet protocol (IP) address, etc., associated with a document, keywords associated with the document, etc. and/or a topic identifier that identifies a topic and/or subtopic to which the document is assigned. The information in the entry may be used by search component 520 to identify whether the document is relevant to a search query.

Search component 520 may receive a search query and perform a search of index 510 based on the search query to identify documents, as search results that are relevant to the search query. Additionally, or alternatively, search component 520 may receive search results, relevant to the search query, from one or more other search systems (not shown).

Search component 520 may generate scores for the search results. As described above, each search result may correspond to a document that has been identified as relevant to the search query. In one implementation, the score, for a search result, may reflect a measure of relevance of the corresponding document to the term(s) of the search query. Several techniques exist for measuring the relevance of a document to a search query. In another implementation, the score, for a search result, may reflect a measure of quality of the corresponding document. In this other implementation, the search query may be used to identify a relevant document, which is scored based on the document's measure of quality. Several techniques exist for measuring the quality of a document, such as a link-based technique, a technique based on the source of the document, a technique based on an age of the document, a technique based on user behavior relating to the document, etc. In yet another implementation, the score, for a search result, may reflect a combination of a measure of relevance of the corresponding document to a search query and a measure of quality of the corresponding document. In a further implementation, the score, for a search result, may reflect a weighted combination of a measure of relevance of the corresponding document to a search query and a measure of quality of the corresponding document, where the measure of relevance may be weighted differently from the measure of quality. In yet a further implementation, the score, for a search result, may be determined in another manner.

Search component 520 may rank the search results based on the scores. For example, search component 520 may create a list of search results and sort the search results, in the list, based on the scores of the search results. Search component 520 may provide the list of search results to topic processing component 530.

Topic processing component 530 may obtain topics information, associated with a hierarchy of topics and subtopics, such as hierarchy 400 of FIG. 4, to determine which topics and/or subtopics to assign to context information and/or the search results. Topic processing component 530 may, for example, generate one or more first scores, associated with context information received from client 210, that represents a measure of relevance between the context information and one or more of the topics and/or subtopics. Topic processing component 530 may identify a topic and/or subtopic that is most relevant to the context information based on a highest first score relative to the other first scores. Topic processing component 530 may select the topic and/or subtopic with which the highest first score is associated.

Topic processing component 530 may also, or alternatively, generate second scores associated with the search results, that represent measures of relevance between the search results and the selected topic and/or subtopic. Topic processing component 530 may identify one or more of the second scores that are greater than a threshold and may provide search results associated with the one or more second scores that are greater than the threshold. Topic processing component 430 may output the identified search results, that correspond to the selected topic and/or subtopic, as a search result document.

In another implementation, topic processing component 530 may generate second scores for each search result that is stored within index 510 based on a measure of relevance to each topic and/or subtopic within the hierarchy of topics and subtopics. In this example, topic processing component 530 may generate the second scores in an offline manner Topic processing component 530 may, for each search result (or each document in index 510), identify one or more respective second scores that are greater than another threshold. Topic processing component 530 may also, or alternatively, associate the one or more respective second scores, that are greater than the other threshold, with each of the search results. Topic processing component 530 may also, or alternatively, associate each of one or more topics and/or subtopics, to which the one or more respective second scores that are greater than the other threshold correspond, with each of the search results. Associating the one or more respective second scores with each of the search results, may allow topic processing component 530, during an online operation, to look up second scores, associated with a selected topic and/or subtopic, that are greater than the threshold. Topic processing component 530, in another example, may look up search results with which the selected topic and/or subtopic has been associated. Topic processing component 530 may provide search results with which the select topic has been associated and/or search results associated with the second scores that are greater than the threshold, that are most relevant to the selected topic and/or subtopic.

Figure 5B:
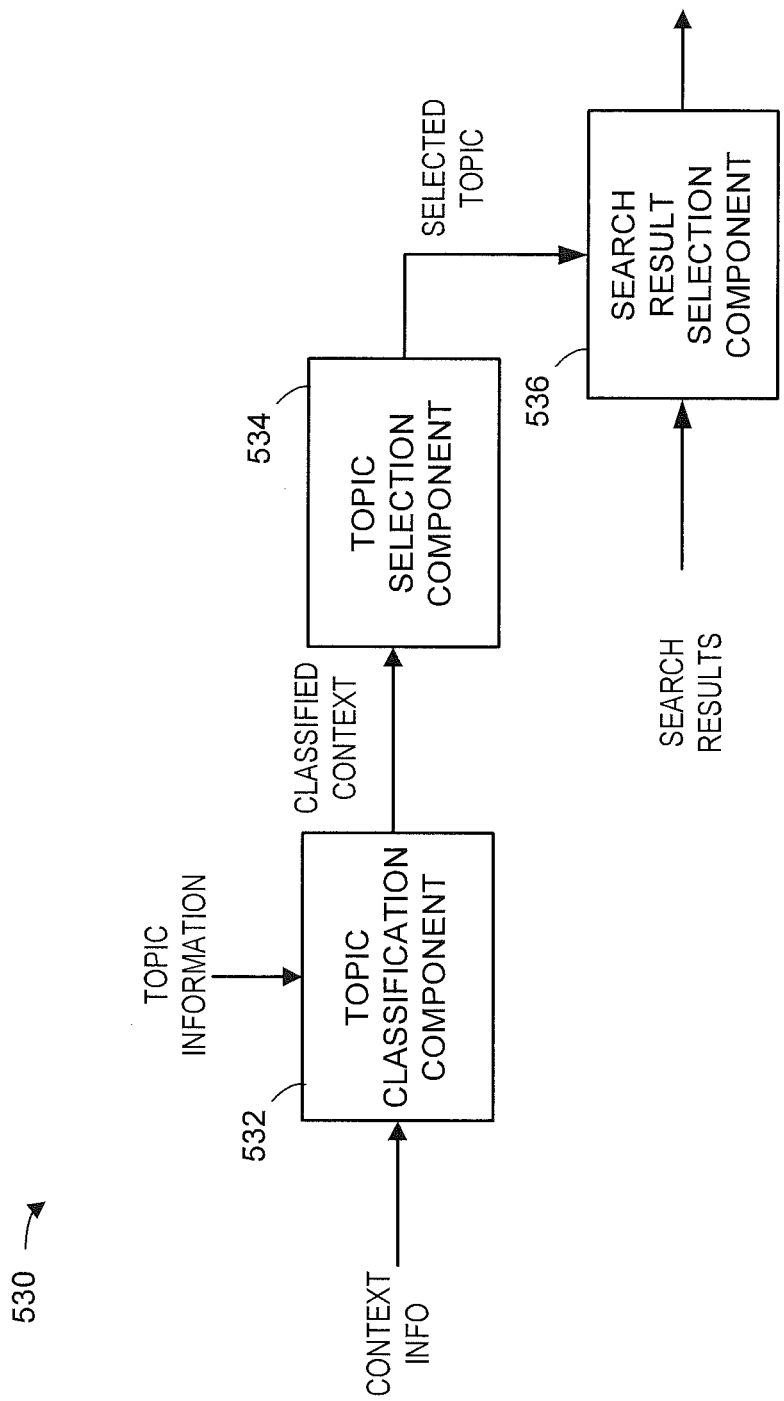
FIG. 5B is a diagram of example functional components of a topic processing component of FIG. 5A.

FIG. 5B is a diagram of example functional components of a topic processing component 530. Each of the functional components, shown in FIG. 5B, may be implemented by one or more of the components described with regard to FIG. 3. As shown in FIG. 5B, topic processing component 530 includes a topic classification component 532, a topic selection component 534, and a search result selection component 536. The functional components, included in FIG. 5B, are provided for explanatory purposes. In another implementation, topic processing component 530 may include additional functional components, fewer functional components, different functional components, or differently arranged functional components than are illustrated in FIG. 5B.

Topic classification component 532 may assign context information and/or search results to topics and/or subtopics. The context information may include content, associated with a document, that was received from client 210. Additionally, or alternatively, the context information may include content obtained from a document that was retrieved, from servers 230 and/or 240, based on an address, such as a URL, URI, etc., received from client 210. Topic classification component 532 may analyze the content to identify one or more keywords and/or phrases, images, videos, links to other documents, etc. associated with the content.

Topic classification component 532 may retrieve a hierarchy of topics and subtopics and may assign the context information to one or more of the topics and/or subtopics. Topic classification component 532 may use one or more classification techniques to assign the context information to a topic and/or subtopic. One technique may use information associated with the context information to determine one or more topics and/or subtopics for the context information. For example, this technique may analyze the content, associated with the context information, to identify the one or more topics and/or subtopics to which the context information is to be assigned. This technique may, for example, compare keywords, associated with the context information, to the hierarchy of topics and subtopics. Topic classification component 532 may identify a topic and/or one or more subtopics, associated with the topic, that match one or more of the keywords. Topic classification component 532 may assign a respective first score to each topic and/or subtopics based on a quantity of terms and/or phrases that match each topic or subtopic. A first score, assigned to a topic (e.g., T) and/or the one or more subtopics (e.g., S1 to a child subtopic, S2 to a grandchild subtopic, S3 to the great grandchild subtopic, etc.) may increase or decrease as the quantity of terms and/or phrases that match the topic and/or the one or more subtopics increases or decreases, respectively.

Topic classification component 532 may generate a total first score (e.g., S), for the topic based on a combination of the first scores assigned to the topic and/or the one or more subtopics, such as where S=T+S1+S2+S3, etc. Topic classification component 532 may also, or alternatively, generate a weighted first score (e.g., WS) for the topic based on a weighted combination of the first scores assigned to the topic and/or the subtopic. The weighted combination of the first scores may be based on the first scores and/or respective weighting factors assigned to each of the topics (e.g., W1) and/or the subtopics (e.g., W1.1, W1.1.2, W1.1.2.3, etc.), such as where WS=W1*T+W1.1*S1+W1.1.2*S2+W1.1.2.1*S3, etc.). Topic classification component 532 may generate other total first scores and/or weighted first scores for each topic and/or subtopic associated with the hierarchy of topics and subtopics.

Another classification technique may identify the topic and/or the one or more subtopics to be assigned to the context information by comparing respective predetermined content, associated with each of the topics and/or subtopics, to the context information. The predetermined content, for a particular topic and/or subtopic, may, for example, include one or more documents, terms and/or phrases (e.g., keywords and/or key phrases, respectively), images, addresses, video content, etc. that are associated with the particular topic or subtopic. Topic classification component 532 may, for example, determine whether one or more of the terms and/or phrases, images, addresses, videos, etc., associated with the context information, match any terms and/or phrases, images, addresses, videos, etc., associated with the respective predetermined content. Topic classification component 532 may, in a manner similar to that described above, assign first scores to the topic and/or the one or more subtopics based on a respective degree of match identified between the context information and the respective predetermined content. Topic classification component 532 may, in a manner similar to that described above, generate a total first score based on a combination of first scores, and/or generate a weighted first score based on a combination of the first scores and the weighting factors.

In another example implementation, topic classification component 532 may, in an offline manner similar to that described above with respect to FIG. 5A, analyze the content associated with each search result and may assign each of the search results to one or more topics and/or subtopics that are relevant to each of the search results. Topic classification component 532 may, in a manner similar to that described above, assign each search result to one or more topics and/or subtopics based on second scores and/or weighted second scores generated for each search result. Thus, each search result may be associated, within index 510, with one or more second scores and/or weighted second scores that correspond to the one or more topics and/or subtopics associated with the hierarchy topics and subtopics. In another example, each search result may be associated, within index 510, with one or more topics and/or subtopics to which each of the search results are relevant based on the second scores and/or weighted second scores.

Topic classification component 532 may output, to topic selection component 534 and as classified context, the first scores and/or weighted first scores that are assigned to the one or more topics and/or subtopics.

Topic selection component 534 may select a topic and/or one or more subtopics to which the context information is most relevant. Topic selection component 534 may, for example, analyze the first scores associated with the context information to identify a highest first score among the first scores. Topic selection component 534 may select a topic with which the highest first score is associated. Additionally, or alternatively, topic selection component 534 may identify one or more subtopics, associated with the selected topic, and may select one of the one or more subtopics as the selected topic. Topic selection component 534 may output, to search result selection component 536, information identifying the selected topic and/or the one or more subtopics.

In one example, topic selection component 534 may determine that first scores associated with the context information are generally uniform across each of the topics, within the hierarchy of topics. Topic selection component 534 may, for example, determine that the scores are generally uniform when a difference between the highest first score and another first score, such as a second highest first score, a lowest first score, a mean first score, etc., is less than a threshold. Based on the determination that the scores are generally uniform, topic selection component 534 may not select the topic and/or the one or more subtopics. Topic selection component 534 may, in this example, output, to search result selection component 536, a notification that the search results are to be provided, to client 210, in a manner that is not based on selection of the topic and/or one or more subtopics. The example above represents one way that the search results may be provided in a manner that is not based on selection of the topic and/or one or more subtopics. There may be other, different ways that the search results may be provided in the manner that is not based on selection of the topic and/or one or more subtopics.

Search result selection component 536 may select search results that correspond to the selected topic and/or one or more subtopics. For example, search result selection component 536 may compare one or more terms associated with each of the search results to the selected topic and/or one or more subtopics. Search result selection component 536 may assign respective second scores to each of the search results based on a degree of match between the one or more terms and the selected topic and/or one or more subtopics. In another example, search result selection component 536 may compare respective content, such as one or more terms, images, addresses, etc. associated with each of the search results, to predetermined content associated with the selected topic and/or one or more subtopics. Search result selection component 536 may assign respective second scores to each of the search results based on a degree of match between the respective content associated with each of the search results and the predetermined content associated with the selected topic and/or one or more subtopics.

For example, search result selection component 536 may select search results with second scores that are greater than a threshold. In another example, search result selection component 536 may rank the search results based on the second scores associated with the selected topic and/or the one or more subtopics. Search result selection component 536 may select, from the ranked search results, the top L (where L≥1) highest ranked search results. The selected search results may correspond to search results with a highest correlation and/or relevancy to the selected topic and/or the one or more subtopics. Additionally, or alternatively, search result selection component 536 may select search results associated with top L highest second scores without ranking the search results.

In another example, search result selection component 536 may look up second scores, stored within index 510, that correspond to the selected topic and/or one or more subtopics. Selection component 536 may select search results associated with second scores that are greater than the threshold, based on the top L highest second scores, or based on the top L ranked second scores.

Search result selection component 536 may provide the selected search results, to client 210, in an order based on the scores of the selected search results. For example, search result selection component 536 may provide, to client 210, the selected search results in a first order that is based on the second scores (e.g., X), where a highest second score is provided first, a next-highest second score is provided second, and so on. In another example, search result selection component 536 may provide the selected search results, to client 210, in a second order based on third scores (e.g., Y) assigned to the search results, by search component 520, based on a measure of relevance to the query and/or measure of quality of the search results. In this example, search result component 536 may provide the selected search results in the second order, where a highest third score is provided first, a next-highest third score is provided second, and so on. In yet another example, search result selection component 536 may provide the selected search results to client 210 in a third order that is based on a combination of the second scores and the third scores. For example, search result selection component 536 may generate a respective combined score (e.g., Z) for each of the selected search results based a respective second score (e.g., X) and a respective third score (e.g., Y), where Z=X+Y. In this example, search result component 536 may provide the selected search results in the third order, where a highest combined score is provided first, a next-highest combined score is provided second, and so on.

Search result selection component 536 may generate a search result document, such as a hypertext markup language (HTML) document, that includes the selected search results ordered based on the scores. Search result selection component 536 may provide, to client 210, the search result document in response to the search query.

Figure 6:
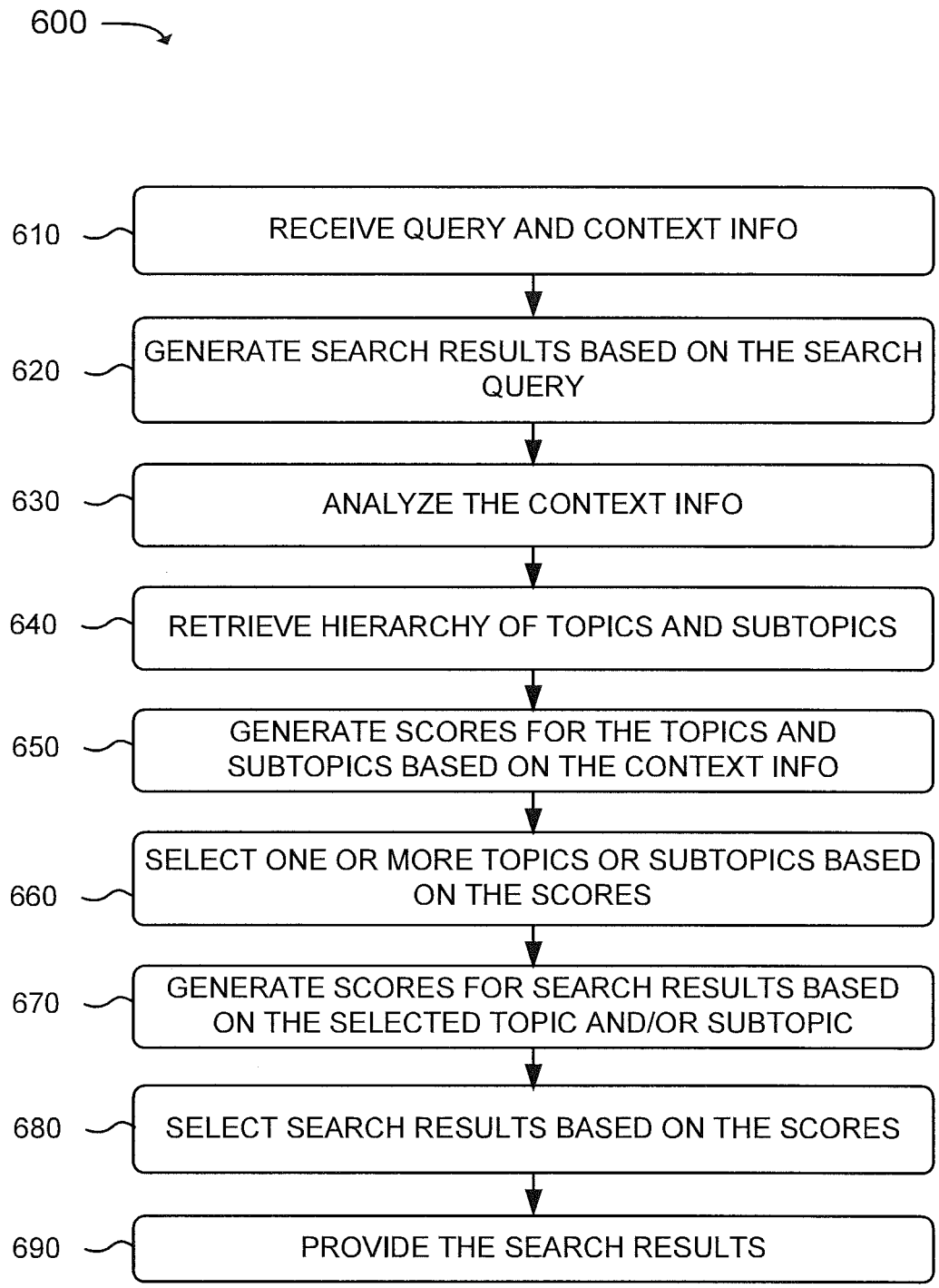
FIG. 6 is a flowchart of an example process for generating a search result document that includes search results associated with a topic.

FIG. 6 is a flowchart of an example process 600 for generating a search result document that includes search results associated with a topic and/or one or more subtopics. In one implementation, process 600 may be performed by server 220. In another implementation, process 600 may be performed by one or more other devices instead of, or possibly in conjunction with, server 220. For example, some or all of process 600 may be performed by client 210 and/or server 230 or 240.

Process 600 includes receiving a search query and context information (block 610). For example, a user of client 210 may use a browser, such a web browser, to access a user interface of search system 225. Via the user interface, the user may enter a search query. Client 210 may transmit the search query to search system 225. Search system 225 may receive the search query from client 210. Additionally, or alternatively, via the user interface, the user may enter an address, such as a URL, a URI, an IP address, etc. associated with a website via which a document can be accessed. Additionally, or alternatively, via the user interface, the user may enter content, such as one or more terms and/or phrases, information associated with an image, information associated with a video, etc. The content may, in one example, be selected by the user, using a pointing device, a keyboard, etc., from a document being displayed on client 210. In this example, the user can select a portion of a document currently displayed by client 210. Additionally, or alternatively, the user can upload the content, such as a document stored in a memory accessible by client 210. Additionally, or alternatively, an address associated with the document may be automatically obtained by the browser. Client 210 may transmit, as context information, the address and/or the content to search system 225, and search system 225 may receive the context information from client 210.

Process 600 includes generating search results based on the search query (block 620). For example, as described above, search system 225 may perform a search of one or more indexes, such as index 510, to identify documents, as search results that are relevant to the search query. Search system 225 may determine scores for the search results and may rank the search results based on their scores, as described above.

In another example, search system 225 may determine that top L (where L≥1) scores, assigned to the search results, are less than a threshold. Based on the determination that the top L scores are less than a threshold, search system 225 may provide the search results, to client 210, based on the scores and/or without determining a relevance of the search results to a topic and/or subtopic to which the context information is relevant.

Process 600 includes analyzing the context information (block 630). For example, search system 225 may analyze the context information to determine whether the context information includes content and/or an address. If search system 225 determines that the context information includes content, then search system 225 may obtain, from the content, one or more terms and/or phrases, information associated with an image, information associated with a video, etc.

Additionally, or alternatively, if search system 225 determines that the context information includes the address, then search system 225 may use the address to retrieve a copy of a document, associated with the address, that has been temporarily stored (e.g., cached) in a memory associated with server 220. Additionally, or alternatively, search system 225 may use the address to access servers 230 and/or 240 to obtain a document, such as a web page, etc., from servers 230 and/or 240 if a cached copy of the document cannot be retrieved from the memory. Search system 225 may obtain content from the document by selecting one or more terms and/or phrases, information associated with an image included within the document, information associated with a video included within the document, etc.

Process 600 includes retrieving a hierarchy of topics and subtopics (block 640) and generating scores for the topics and subtopics based on the context information (block 650). For example, search system 225 may retrieve, from a memory associated with server 220, information associated with a hierarchy of topics and subtopics. As described above, search system 225 may generate first scores for each of the topics and/or subtopics within the hierarchy of topics and/or subtopics using one or more classification techniques. The first scores may represent a respective measure of relevance that the context information has with respect to each topic and/or subtopic within the hierarchy of topics and subtopics.

In another example, search system 225 may identify one or more first scores, associated with a document from which the context information was obtained, that were generated at a prior point in time during an offline operation. In this example, the search system 225 may perform a look up operation to retrieve the first scores, associated with the document, from a memory, such as index 510 of FIG. 5A, associated with server 220.

Process 600 includes selecting one or more topics and/or subtopics based on the scores (block 660). For example, search system 225 may, as described above, select a topic and/or one or more subtopics, from among the hierarchy of topics and subtopics, to be associated with the context information. Search system 225 may, for example, identify a highest first score, from among the generated first scores, and may select a topic and/or one or more subtopics that correspond to the highest first score. Search system 225 may associate, with the context information, the selected topic and/or one or more subtopics.

In another example, search system 225 may select more than one topic and/or subtopics by identifying a highest first score, a next-highest first score, etc. from among the generated first scores. Search system 225 may select topics and/or subtopics that correspond to the highest first score, the next-highest first score, etc. Search system 225 may associate the topics and/or subtopics with the context information.

In a further example, search system 225 may not select a topic and/or subtopic when a highest first score is less than a threshold. In still another example, search system 225 may not select a topic and/or subtopic when a difference between a highest first score and a next highest first score is less than another threshold. In the examples when a topic and/or subtopic is not selected, search system 225 may provide search results, to client 210, that were identified as relevant to the search query.

Process 600 includes generating scores for search results based on the selected topic and/or subtopic (block 670), selecting search results based on the scores (block 680), and providing the selected search results (block 690). For example, as described above, search system 225 may use one or more classification techniques to generate second scores for the search results based on measures of relevance to the selected topic and/or subtopic.

In another example, search system 225 may identify second scores, associated with the search results, that were generated at a prior point in time during an offline operation. In this example, the search system 225 may perform a look up operation to retrieve the second scores from a memory, such as index 510 of FIG. 5A, associated with server 220. The second scores may correspond to respective measures of relevance between each of the search results and the selected topic and/or subtopic.

Additionally, or alternatively, search system 225 may, as described above, identify one or more of the second scores that are associated with the selected topic and/or one or more subtopics and may select search results based on the one or more second scores. Search system 225 may provide, to client 210, the selected search results in an order that is based on the second.

In another example, search system 225 may determine that a quantity of search results with second scores that correspond to the selected topic and/or subtopic is less than a threshold. Based on the determination that the quantity of search results, with second scores that are less than the threshold, search system 225 may provide search results, to client 210, that were identified as relevant to the search query and/or without regard to the selected topic and/or subtopic. Search system 225 may provide, to client 210, the search results in an order that is based on the scores that were generated based on the measure of relevance to the search query and/or the measure of quality.

In still a further example, search system 225 may determine that all of the search results associated with the selected topic and/or subtopic, are associated with scores, based on a measure of relevance to the search query and/or a measure of quality, that are less than a threshold. Based on the determination that all of the search results, associated with the selected topic and/or subtopic, are associated with scores that are less than a threshold, search system 225 may provide search results, to client 210, that were identified as relevant to the search query and/or without regard to the selected topic and/or subtopic. Search system 225 may provide, to client 210, the search results in an order that is based on the scores that were generated based on the measure of relevance to the search query and/or the measure of quality.

In another example, search system 225 may, as described above, provide the selected search results, to client 210, in an order that is based on combined scores associated with the second scores and the scores that are based on the measure of relevance to the search query.

Additionally, or alternatively, search system 225 may provide, to client 210, a search result document, such as an HTML-based document, that includes the selected search results ranked in one of the orders described above.

The description below provides an example of how search system 225, performing process 600, may generate search results, associated with a selected topic and/or subtopic, based on a search query and context information. For example, a user, of client 210, may enter a search query into a browser associated with client 210. The user may also enter, into the browser, information that identifies a document as context information. The user may cause client 210 to transmit the search query and the context information to search system 225. Search system 225 may receive the search query and the context information from client 210. Search system 225 may perform a search of one or more indexes, such as index 510, to identify documents, as search results that are relevant to the search query. Search system 225 may determine scores for the search results and may rank the search results based on their scores, as described above.

Search system 225 may, in one example, perform a look up operation to identify a topic and/or subtopic with which the context information is most relevant if the document has been stored in index 510 and/or has been classified based on relevance to a hierarchy of topics and/or subtopics. For example, search system 225 may identify, within index 510, one or more first scores associated with the document. Search system 225 may also, or alternatively, identify a highest first score, of the one or more first scores, that represents the topic and/or subtopic with which the document is most relevant.

If the document has not been stored in index 510 and/or has not been classified based on relevance to the hierarchy of topics and/or subtopics, search system 225 may identify the topic and/or subtopic in another way. For example, search system 225 may retrieve the hierarchy of topics and/or subtopics and may compare one or more terms, obtained from the context information, to each topic and/or subtopic within the hierarchy of topics and subtopics. Search system 225 may assign first scores to each of the topics and/or subtopics based on measures of relevance between the one or more terms and the topics and/or subtopics. Search system 225 may identify a highest first score, from among the first scores, and may select a topic and/or subtopic associated with the highest first score.

Search system 225 may perform a look up operation to identify second scores, associated with the search results, that corresponds to the selected topic and/or subtopic. Search system 225 may provide, to client 210, search results associated with a second score that is greater than a threshold. In another example, search system 225 may compare each of the search results to the selected topic and/or subtopic and may assign respective second scores, to each of the search results, based on a respective measure of relevance between each of the search results and the selected topic and/or subtopic. Search system 225 may identify top K (K≥1) highest second scores from among the second scores and may provide, to client 210, search results associated with the top K highest second scores.

A system and/or method, as described herein, may filter search results based on one or more topics to assist users in finding search results of interest. The one or more topics may be based on context information and a search query provided by the user. The context information may include a link, such as, a uniform resource locator (URL); a document to which the link corresponds, a snippet of text from the document, etc. As a result of the filtering, users may be able to locate particular search results, associated with the one or more topics in which the users are interested, thereby improving the users' search experience.

The foregoing description provides illustration and description, but is not intended to be exhaustive or to limit the implementations to the precise form disclosed. Modifications and variations are possible in light of the above teachings or may be acquired from practice of the implementations.

For example, while a series of blocks has been described with regard to FIG. 6, the order of the blocks may be modified in other implementations. Further, non-dependent blocks may be performed in parallel.

Also, example user interfaces have been described with respect to FIGS. 1A and 1B. In other implementations, the user interfaces may include additional, fewer, different, or differently arranged items of information.

As used herein, the term component is intended to be broadly interpreted to refer to hardware or a combination of hardware and software, such as software executed by a processor.

It will be apparent that systems and methods, as described above, may be implemented in many different forms of software, firmware, and hardware in the implementations illustrated in the figures. The actual software code or specialized control hardware used to implement these systems and methods is not limiting of the implementations. Thus, the operation and behavior of the systems and methods were described without reference to the specific software code—it being understood that software and control hardware can be designed to implement the systems and methods based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    receiving a search query submitted by a user of a client device;
    receiving, from the client device, context information that includes a network address of a document that a user of the client device has associated with the search query;
    for each of multiple topics, determining a first score that reflects an extent to which the topic is indicated as relevant to the context information that includes the network address of the document that the user of the client device has associated with the search query;
    selecting a particular topic, from among the multiple topics, based on the first scores;
    selecting a set of search results from multiple different domains that are identified as relevant to the search query;
    for each search result of the set, determining a second score that reflects an extent to which the particular topic is indicated as relevant to the search result;
    selecting one or more particular search results from the set of search results based on the second scores; and
    providing, for output, a search results page that identifies the one or more particular search results.

2. The method of claim 1, the method further comprising:
    retrieving a copy of the document associated with the network address; and
    obtaining one or more keywords that are associated with the document.

3. The method of claim 2, wherein determining a first score that reflects an extent to which the topic is indicated as relevant to the context information includes:
    comparing the one or more keywords that are associated with the document to data associated with each of the multiple topics.

4. The method of claim 1, wherein selecting one or more particular search results from the set of search results based on the second scores comprises:
    determining whether each of the search results are associated with a second score that exceeds a predetermined threshold; and
    selecting each of the search results that are associated with a second score that exceeds the predetermined threshold.

5. A system comprising:
    one or more computers and one or more storage devices storing instructions that are operable, when executed by the one or more computers, to cause the one or more computers to perform operations comprising:
        receiving a search query submitted by a user of a client device;
        receiving, from the client device, context information that includes a network address of a document that a user of the client device has associated with the search query;
        for each of multiple topics, determining a first score that reflects an extent to which the topic is indicated as relevant to the context information that includes the network address of the document that the user of the client device has associated with the search query;
        selecting a particular topic, from among the multiple topics, based on the first scores;
        selecting a set of search results from multiple different domains that are identified as relevant to the search query;
        for each search result of the set, determining a second score that reflects an extent to which the particular topic is indicated as relevant to the search result;
        selecting one or more particular search results from the set of search results based on the second scores; and
        providing, for output, a search results page that identifies the one or more particular search results.

6. The system of claim 5, the operations further comprising:
    retrieving a copy of the document associated with the network address; and
    obtaining one or more keywords that are associated with the document.

7. The system of claim 6, wherein determining a first score that reflects an extent to which the topic is indicated as relevant to the context information includes:
    comparing the one or more keywords that are associated with the document to data associated with each of the multiple topics.

8. The system of claim 5, wherein selecting one or more particular search results from the set of search results based on the second scores comprises:
    determining whether each of the search results are associated with a second score that exceeds a predetermined threshold; and
    selecting each of the search results that are associated with a second score that exceeds the predetermined threshold.

9. A non-transitory computer-readable medium storing software comprising instructions executable by one or more computers which, upon such execution, cause the one or more computers to perform operations comprising:
- receiving a search query submitted by a user of a client device;
- receiving, from the client device, context information that includes a network address of a document that a user of the client device has associated with the search query;
- for each of multiple topics, determining a first score that reflects an extent to which the topic is indicated as relevant to the context information that includes the network address of the document that the user of the client device has associated with the search query;
- selecting a particular topic, from among the multiple topics, based on the first scores;
- selecting a set of search results from multiple different domains that are identified as relevant to the search query;
- for each search result of the set, determining a second score that reflects an extent to which the particular topic is indicated as relevant to the search result;
- selecting one or more particular search results from the set of search results based on the second scores; and
- providing, for output, a search results page that identifies the one or more particular search results.

10. The computer-readable medium of claim 9, the operations further comprising:
- retrieving a copy of the document associated with the network address; and
- obtaining one or more keywords that are associated with the document.

11. The computer-readable medium of claim 10, wherein determining a first score that reflects an extent to which the topic is indicated as relevant to the context information includes:
- comparing the one or more keywords that are associated with the document to data associated with each of the multiple topics.

12. The computer-readable medium of claim 9, wherein selecting one or more particular search results from the set of search results based on the second scores comprises:
- determining whether each of the search results are associated with a second score that exceeds a predetermined threshold; and
- selecting each of the search results that are associated with a second score that exceeds the predetermined threshold.

* * * * *